United States Patent [19]

Combs

[11] 3,966,841

[45] June 29, 1976

[54] MIXTURES OF POLYESTERS AND DAC-B RESIN

[75] Inventor: Robert L. Combs, Kingsport, Tenn.

[73] Assignee: Eastman Kodak Company, Rochester, N.Y.

[22] Filed: June 30, 1975

[21] Appl. No.: 591,551

[52] U.S. Cl. ............................ 260/873; 264/176 F; 264/211
[51] Int. Cl.² ..................................... C08L 67/06
[58] Field of Search .................................. 260/873

[56] References Cited
UNITED STATES PATENTS

| 3,093,601 | 6/1963 | Gessler et al. .................. 260/873 |
| 3,437,629 | 4/1969 | Van Bramer et al. ............ 260/31.8 |
| 3,652,725 | 3/1972 | Diaz et al. ...................... 260/876 B |
| 3,700,758 | 10/1972 | Johnson, Jr. et al. .......... 260/897 R |
| 3,701,760 | 10/1972 | Hogemeyer, Jr. et al. ....... 260/82 |
| 3,794,698 | 2/1974 | Diaz et al. ...................... 260/897 R |
| 3,850,858 | 11/1974 | Park ............................... 260/27 |

Primary Examiner—J. Ziegler
Attorney, Agent, or Firm—Charles R. Martin; Daniel B. Reece, III

[57] ABSTRACT

Disclosed are compositions of DAC-B hydrocarbon resin and a poly(ethylene terephthalate) type polyester, a poly(tetramethylene terephthalate) type polyester, or a poly(1,4-cyclohexylenedimethylene terephthalate) type polyester. These compositions have a lower melt viscosity at elevated temperatures than the polyesters alone and can therefore be melt spun into fibers at a lower temperature than the polyester alone. Fibers spun from these compositions have properties substantially equivalent to the properties of fibers spun from the polyester alone.

6 Claims, No Drawings

MIXTURES OF POLYESTERS AND DAC-B RESIN

This invention relates to an additive for fiber forming polyesters that lowers the melt viscosity and allows fibers to be melt spun at a lower temperature but does not substantially alter the properties of the fibers.

Melt spinning of synthetic fibers from linear thermoplastic polymers has been practiced commercially for years and is a well developed art. Today, most, if not all, of the polyester fibers sold commercially are prepared by melt spinning. Although melt spinning is used commercially to prepare polyester fibers, there are still a number of problems associated with melt spinning polyester fibers.

One of the most difficult problems is the high melt viscosity of polyesters at melt spinning temperatures. The high melt viscosity of polyesters requires that high temperatures be utilized for melt spinning. The use of high temperatures creates a number of significant problems. First, the cost of creating the high temperature is high. Second, the high temperatures result in a breaking of the polymeric chain and therefore the molecular weight of the polyester is reduced. A reduction in molecular weight of the polyester adversely changes the character of the fibers, particularly the mechanical properties.

Lowering the melt viscosity of polyesters so that a reduced melt spinning temperature can be used is not a difficult task. There are a number of additives known in the art that will lower the melt viscosity of polyesters and allow fibers to be melt spun at a lower temperature. The problem is that while there are a number of additives that will lower the melt viscosity of the polyester, these additives typically alter the properties of the fibers to a commercially unacceptable level.

I have now invented three compositions comprised of certain type polyesters and an additive that lowers the melt viscosity but does not substantially alter the properties of the fibers.

The three compositions of this invention are thought to be unobvious over the prior art, not because they lower the melt viscosity of the polyester and allow fibers to be spun at lower temperature, but because they lower the melt viscosity and do not substantially alter the properties of the fibers. Thus, the three compositions of this invention are thought to be unobvious because each of these compositions have a combination of a reduced melt viscosity at melt spinning temperatures, compared to the polyester portion of the composition, and can be melt spun into textile fibers which have properties substantially equivalent to the properties of textile fibers of the polyester portion of the composition.

As described above, this invention consists of three compositions. In all three compositions, DAC-B hydrocarbon resin is added to a particular type of polyester.

The first composition can be broadly described as a composition comprised of a poly(ethylene terephthalate) type polyester and DAC-B hydrocarbon resin. More specifically, the first composition can be described as a composition comprised of a mixture of A. a polyester of
 1. a dicarboxylic acid component which is at least 80 mole percent terephthalic acid,
 2. a diol component which is at least 80 mole percent ethylene glycol, and
B. from 1–14 weight percent, based on the weight of the polyester, DAC-B hydrocarbon resin.

The second composition of this invention can be broadly described as a composition comprised of a poly(tetramethylene terephthalate) type polyester and DAC-B hydrocarbon resin. More specifically, the second composition of this invention can be described as a composition comprised of a mixture of A. a polyester of
 1. a dicarboxylic acid component which is at least 80 mole percent terephthalic acid,
 2. a diol component which is at least 80 mole percent 1,4-butanediol, and
B. from 1–22 weight percent, based on the weight of the polyester, DAC-B hydrocarbon resin.

The third composition of this invention can be broadly described as a poly(1,4-cyclohexylenedimethylene terephthalate) type polyester and DAC-B hydrocarbon resin. More specifically, this composition can be described as a composition comprised of a mixture of A. a polyester of
 1. a dicarboxylic acid component which is at least 80 mole percent terephthalic acid,
 2. a diol component which is at least 80 mole percent 1,4-cyclohexanedimethanol, and
B. from 1–32 weight percent, based on the weight of the polyester, DAC-B hydrocarbon resin.

The polyesters useful in this invention are well known in the art and can be made by conventional processes.

In all three compositions of this invention the polyester is composed of a dicarboxylic acid component which is at least 80 mole percent terephthalic acid. The dicarboxylic acid component which is the remaining 20 mole percent can be an aliphatic, alicyclic and aromatic dicarboxylic acid having up to 40 carbon atoms. Examples of such acids include oxalic; malonic; dimethylmalonic; succinic; glutaric, adipic; 2-methyladipic; trimethyladipic; pimelic; 2,2-dimethylglutaric; 3,3-diethylsuccinic; azelaic; sebacic; suberic; fumaric; maleic; itaconic; 1,2-cyclopentanedicarboxylic; 1,3-cyclopentanedicarboxylic; 1,2-cyclohexanedicarboxylic; 1,3-cyclohexanedicarboxylic; 1,4-cyclohexanedicarboxylic; 1,4-cyclohexenedicarboxylic; phthalic; terephthalic; isophthalic, 4-methylisophthalic; t-butylisophthalic; 2,5-norbornanedicarboxylic; 1,4-naphthalic; 2,5-naphthalenedicarboxylic; 2,6-naphthalenedicarboxylic; and 2,7-naphthalenedicarboxylic acids. It will be understood that the corresponding esters of terephthalic acid and the above acids, such as dimethyl esters, are included in the term "dicarboxylic acid". In a preferred aspect of this invention, the dicarboxylic acid component is terephthalic acid.

In this invention the polyester is prepared from a diol component which in the first composition is at least 80 mole percent ethylene glycol, in the second composition is at least 80 mole percent tetramethylene glycol, and in the third composition is at least 80 mole percent 1,4-cyclohexanedimethanol. In all three compositions the remaining diol component can be an aliphatic or alicyclic diol having up to 120 carbon atoms. Examples of such diols include ethylene glycol; diethylene glycol; 1,2-propylene glycol; 2,4-dimethyl-2-ethylhexane-1,3-diol; 2,2,4-trimethyl-1,3-pentanediol; 2,2-dimethyl-1,3-propanediol; 2-ethyl-2-butyl-1,3-propanediol; 2,2-diethyl-1,3-propanediol; 2-methyl-2-propyl-1,3-propanediol; 3-ethyl-2-isobutyl-1,3-propanediol; 1,3-butanediol; 1,4-butanediol; 1,4-butenediol; 1,5-pentanediol, 1,6-hexanediol; 1,10-decanediol; 2,2,4-trimethyl-1,6-hexanediol; 1,4-cyclohexanediol; 1,2-cyclohexanedimethanol, 1,3-cyclohexanedimethanol, polyoxyethylene glycol, polyoxypropylene glycol, polyoxybutene glycol and copolyoxyethylene propylene glycol. In a preferred embodiment of the first composition the diol is ethylene glycol. In a preferred embodiment of the second composition the diol is 1,4-butanediol. In a preferred embodiment of the third composition the diol is 1,4-cyclohexanedimethanol.

The polyesters useful in this invention can be prepared by processes well known in the art. For example the polyesters can be prepared by direct condensation or ester interchange. Preferably the polyesters are prepared by ester interchange. According to this method, the dicarboxylic acid is reacted with an alcohol to form a diester, such as dimethyl terephthalate, and the diester is ester interchanged with a diol to form a bis ester, such as bis 2-hydroxyethyl terephthalate, and the ester interchange product is polycondensed at low pressure and high temperature to form a high molecular weight polyester.

The polyesters of this invention have an inherent viscosity of at least 0.5, and preferably at least 0.6, measured at 25°C. using 0.25 grams of polymer per 100 ml. of a solvent composed of 60 volumes of phenol and 40 volumes of tetrachloroethane.

The DAC-B hydrocarbon resin useful in this invention is well known in the art. In this invention, the term "DAC-B hydrocarbon resin" means a hydrocarbon resin prepared in accordance with the disclosure of U.S. 3,701,760, herein incorporated by reference. DAC-B hydrocarbon resin can also be prepared in accordance with the disclosure of U.S. Pat. No. 3,437,629. DAC-B hydrocarbon resin has been reported to be useful in a variety of applications such as disclosed in U.S. Pat. Nos. 3,652,725; 3,700,758; 3,794,698; and 3,850,858.

The amount of DAC-B hydrocarbon resin that is used in this invention varies in each of the three compositions. In the first composition comprised of a poly(ethylene terephthalate) type polyester and DAC-B hydrocarbon resin, the amount of DAC-B hydrocarbon resin is broadly from 1–14 weight percent, preferably is 3–4 weight percent based on the weight of the polyester. In the second composition of the invention comprised of a poly(tetramethylene terephthalate) type polyester and DAC-B hydrocarbon resin, the DAC-B hydrocarbon resin is from 1–22 weight percent, preferably from 6–8 weight percent, based on the weight of the polyester. In the third composition comprised of a poly(1,4-cyclohexylenedimethylene terephthalate) type polyester and DAC-B hydrocarbon resin, the DAC-B hydrocarbon resin is from 1–32 weight percent, preferably from 8–18 weight percent, based on the weight of the polyester.

The upper limit of DAC-B hydrocarbon resin that can be used in the broader embodiment of all three compositions is the maximum amount that can be added to the polyester and still be able to prepare a textile fiber having properties that are substantially equivalent to fibers of the polyester alone. The maximum amount of DAC-B hydrocarbon resin that can be added to the polyester and still be able to prepare a textile fiber having properties that are substantially equivalent to fibers of the polyester alone depends on several factors.

One of the factors influencing the maximum amount of DAC-B hydrocarbon resin is the polarity of the polyester. Generally, the less polar the polyester the higher concentration of DAC-B hydrocarbon resin can be used. Thus, since poly(1,4-cyclohexylenedimethylene terephthalate) type polyesters are less polar than either poly(ethylene terephthalate) type polyesters or poly(tetramethylene terephthalate) type polyesters, the greatest amount of DAC-B hydrocarbon resin can be used in poly(1,4-cyclohexylenedimethylene terephthalate) type polyesters. Since poly(tetramethylene terephthalate) type polyesters are less polar than poly(ethylene terephthalate) type polyesters, more DAC-B hydrocarbon resin can be used in poly(tetramethylene terephthalate) type polyester than poly(ethylene terephthalate) type polyesters.

Another factor influencing the maximum amount of DAC-B hydrocarbon resin is the inherent viscosity of the polyester. Generally, the lower the inherent viscosity of the polyester, the higher the concentration of DAC-B hydrocarbon resin that can be used.

Still another factor influencing the maximum amount of DAC-B hydrocarbon resin is the molecular weight of the DAC-B hydrocarbon resin. In general, the lower the molecular weight of the DAC-B hydrocarbon resin, the more DAC-B hydrocarbon resin can be used.

Yet another factor influencing the maximum amount of DAC-B hydrocarbon resin is the denier of the fiber. Generally, the larger the diameter of the fiber the more DAC-B hydrocarbon resin can be used. For instance, a 150 denier per filament fiber compared to 3 denier per filament fiber can contain almost twice as much DAC-B hydrocarbon resin. When large amounts of DAC-B hydrocarbon resin are used, the textile fiber must be of a high denier, such as 150 denier, to have properties substantially equivalent to fibers of the polyester alone.

The maximum amount of DAC-B hydrocarbon resin that can be used in the preferred embodiment of each of the three compositions of the invention is the maximum amount of DAC-B hydrocarbon resin that can be added to the polyester and still be able to prepare a textile fiber of a typical commercial denier having properties substantially equivalent to fibers of the polyester alone.

The lower limits of DAC-B hydrocarbon resin that can be used in the broader embodiments of all three compositions of the invention is the minimum amount of DAC-B hydrocarbon resin that results in a measurable reduction of the melt spinning temperature. The amount that the melt spinning temperature is lower is thought to be linearly related to the amount of DAC-B hydrocarbon resin present. It is thought that in low ranges of DAC-B hydrocarbon resin, about 2°C. reduction in melt spinning temperature occurs for each 1 weight percent DAC-B hydrocarbon resin present. Since the smallest measurable reduction in melt spinning temperature that can be measured is about 2°C., the minimum amount of DAC-B hydrocarbon resin that can be used in the broader embodiment of all three compositions is 1 weight percent.

The minimum amount of DAC-B hydrocarbon resin that can be used in the preferred embodiment of all three compositions is the minimum amount that creates a particularly desirable reduction in melt spinning temperature. For example, the first composition of the invention containing a minimum of 3 weight percent DAC-B hydrocarbon resin would typically melt spin at about 5° to 7°C. lower than the poly(ethylene terephthalate) alone. The second composition of the invention containing a minimum of 6 weight percent DAC-B hydrocarbon resin would typically melt spin at about 10° to 14°C. lower than the poly(tetramethylene terephthalate) alone. The third composition containing a minimum of 8 weight percent DAC-B hydrocarbon resin would typically melt spin at about 12° to 20°C. lower than the poly(1,4-cyclohexylenedimethylene terephthalate) alone. These compositions cannot be spun below the melting point of the polyester component since the melting point is not changed by the addition of DAC-B hydrocarbon resin. The melt viscosity of the compositions is lowered to such an extent that even high molecular weight polyesters can be spun at temperatures approaching their melting point with little or no difficulty.

The compositions of this invention can be prepared in accordance with techniques well known in the art. For example, granules of the polyester and the DAC-B hydrocarbon resin in powdered form can be dry blended and then extruded. Additionally, the polyester and the DAC-B hydrocarbon resin can be melt blended. In a preferred embodiment, the DAC-B hydrocarbon resin is melted and introduced into the bottom of the polycondensation reactor. In this embodiment, the melt viscosity is lowered in the reactor, and, thus, the reactor is easier to unload.

The compositions of this invention are described as being a "mixture". By the term "mixture" we mean that the DAC-B hydrocarbon resin exists in no separate phase greater than about fifty microns in size.

The compositions of this invention can contain additional materials other than the polyester and the DAC-B hydrocarbon resin. For example, the compositions of this invention can contain delustrants, optical brighteness, antioxidants and other inert materials.

This example illustrates preparation of the composition of this invention and also illustrates the unobvious combination of properties of the composition of the invention.

A polyester is prepared from terephthalic acid and 1,4-cyclohexanedimethanol using a conventional ester interchange procedure. A first portion of the polyester is compounded with DAC-B hydrocarbon resin to prepare a composition of the invention containing 4 weight percent, based on the weight of the polyester, DAC-B hydrocarbon resin. Another portion of the polyester is used to prepare a composition of the invention containing 9 weight percent, based on the weight of the polymer, DAC-B hydrocarbon resin.

A portion of the polyester alone, the composition of the invention containing 4 weight percent DAC-B hydrocarbon resin, and the composition of the invention containing 9 weight percent DAC-B hydrocarbon resin are melt spun into textile fibers under conditions given in Table 1. Table 1 shows the minimum temperatures needed to melt spin each of the three samples into commercially acceptable textile fibers.

Table 1

| | Polyester | Polyester + 4 Wt. Percent DAC-B Hydrocarbon Resin | Polyster + 9 Wt. Percent DAC-B Hydrocarbon Resin |
| --- | --- | --- | --- |
| Melt Spinning Temperature, °C. | 305 | 295 | 295 |
| Extruder Back Pressure, psig. | 530 | 580 | 430 |

As will be observed from considering the data in Table 1, the melt spinning temperature is reduced from 305°C. to 295°C. when DAC-B hydrocarbon resin is added to the polyester. The composition containing 4 weight percent DAC-B hydrocarbon resin is spun with approximately the same back pressure as the polyester control even though the control is spun at 10°C. higher temperature. The reduction in melt spinning temperature indicates this composition has a much lower melt viscosity. The composition containing 9 weight percent DAC-B hydrocarbon resin is also spun at a temperature of 10°C. lower than the polyester and has an even lower back pressure, indicating its melt viscosity is lower than that of the 4 weight percent composition. The melt spinning temperature can not be reduced below about 290°C. because the melting point of the polyester is around 290°C. It is very surprising that commercially acceptable fibers can be spun this close to the melting point of the polyester. The composition containing 4 percent DAC-B hydrocarbon resin can also be satisfactorly spun with some difficutly at 290°C., indicating how close to the melting point commercially acceptable fibers can be melt spun.

The melt spun fibers are then tested for typical mechanical properties. Results of these tests are reported in Table 2.

Table 2

| | Polyester | Polyester + 4 Wt. percent DAC-B Hydrocarbon Resin | Polyester + 9 Wt. percent DAC-B Hydrocarbon Resin |
| --- | --- | --- | --- |
| Tenacity, g/d. | 3.22 | 3.57 | 3.22 |
| Elongation, % | 24.5 | 26.0 | 27.8 |
| Elastic Modulus, g/d. | 34.8 | 28.7 | 34.2 |
| Melting Point, °C. | 291 | 290 | 292 |

As will be observed from considering the data in Table 2, the typical properties of fiber prepared from the composition of the invention containing DAC-B hydrocarbon resin are substantially equivalent to the properties of the fiber prepared from the polyesters alone.

All three fibers are then prepared into a knitted sock and the sock is dyed. All the fibers process well and the fibers of the composition of the invention exhibit a dyeability substantially equivalent to fibers of the polyester alone.

As will be readily concluded from considering the above example, the compositions of the invention have the combination being melt spun into commercially acceptable textile fibers at lower temperatures and the ability to form textile fibers which have properties substantially equivalent to fibers of the polyester alone.

Similar results are obtained if a poly(ethylene terephthalate) type polyester or a poly(terephthalate) type polyester within the scope of the invention are used in place of the poly(1,4-cyclohexylenedimethylene terephthalate). Also, similar results are obtained if different amounts of DAC-B hydrocarbon resin within the scope of the invention are used. Also, similar results are obtained if a different molecular weight of DAC-B hydrocarbon resin is used.

The compositions of this invention can be used to prepare articles other than textile fibers. For example, compositions comprised of poly(tetramethylene terephthalate) and 6 weight percent DAC-B hydrocarbon resin is found to have a spirial-mold-flow length of 121 inches compared to 98 inches for the poly(tetramethylene terephthalate). This indicates the composition of poly(tetramethylene terephthalate) and 6 weight percent DAC-B hydrocarbon resin will fill a complicated mold faster and easier than poly(tetramethylene terephthalate). Properties of articles molded from the composition of poly(tetramethylene terephthalate) and 6 weight percent DAC-B hydrocarbon resin are equivalent to properties of articles molded from poly(tetramethylene terephthalate).

The invention has been described in detail with particular reference to certain preferred embodiments thereof, but it will be understood that variations and modifications can be effected within the spirit and scope of the invention.

I claim:

1. A composition comprised of a mixture of
   A. a polyester of
      1. a dicarboxylic acid component which is at least 80 mole percent terephthalic acid,
      2. a diol component which is at least 80 mole percent ethylene glycol, and
   B. from 1-14 weight percent, based on the weight of the polyester, DAC-B hydrocarbon resin.

2. The composition of claim 1 wherein the polyester is comprised of terephthalic acid and ethylene glycol and the DAC-B hydrocarbon resin is from 3-4 weight percent.

3. A composition comprised of a mixture of
   A. a polyester of
      1. a dicarboxylic acid component which is at least 80 mole percent terephthalic acid,
      2. a diol component which is at least 80 mole percent 1,4-butanediol, and
   B. from 1-22 weight percent, based on the weight of the polyester, DAC-B hydrocarbon resin.

4. The composition of Claim 1 wherein the polyester is comprised of terephthalic acid and 1,4-butanediol, and the DAC-B hydrocarbon resin is from 6-8 weight percent.

5. A composition comprised of a mixture of
   A. a polyester of
      1. a dicarboxylic acid component which is at least 80 mole percent terephthalic acid,
      2. A diol component which is at least 80 mole percent 1,4-cyclohexanedimethanol, and
   B. from 1-32 weight percent, based on the weight of the polyester, DAC-B hydrocarbon resin.

6. The composition of claim 1 wherein the polyester is comprised of terephthalic acid and 1,4-cyclohexanedimethanol, and the DAC-B hydrocarbon resin is from 8-18 weight percent.

* * * * *